United States Patent Office 3,553,025
Patented Jan. 5, 1971

3,553,025
FUEL CELL WITH AN ELECTRODE COMPRISING BARIUM TANTALUM BRONZE OR STRONTIUM NIOBIUM BRONZE
Bernard Patrick John Bockris, Philadelphia, Pa., and Darko Sepa and Aleksandar Damjanovic, Belgrade, Yugoslavia, assignors, by mesne assignments, to Research Corporation, New York, N.Y., a non-profit corporation of New York
No Drawing. Filed Oct. 31, 1967, Ser. No. 679,569
Int. Cl. H01m 27/04
U.S. Cl. 136—86                              2 Claims

ABSTRACT OF THE DISCLOSURE

Barium tantalum and strontium niobium bronzes are catalysts for oxygen reduction at the cathode in fuel cells.

---

This invention relates to the direct conversion of chemical energy to electrical energy by electrochemical reaction in a fuel cell. In one specific aspect, the invention relates to novel electrodes suitable for use in fuel cells wherein such electrodes are employed.

A fuel cell is a primary battery wherein electrical energy is generated directly from the chemical energy of a combustible fuel by electrochemical reaction. In its most basic form, a fuel cell consists of two electrodes, i.e., an anode (fuel electrode) and a cathode (oxygen electrode), an electrolyte which may be acidic or alkaline, a supply of combustible fuel, and a supply of oxygen or other oxidizing gas or liquid.

Each fuel cell electrode comprises a conductor for the transport of the electrical energy generated in the cell in association with a catalyst for the half-cell reaction taking place at the particular electrode. Different catalysts are employed at each of the two electrodes in a given cell since the half-cell reaction taking place at the oxygen electrode differs from the half-cell reaction taking place at the fuel electrode. Moreover, the oxygen reduction reaction at the cathode is essentially independent of the particular fuel being oxidized at the anode.

The present invention is based on the discovery of an improved catalyst for use at the oxygen electrode in systems employing aqueous electrolytes. We have discovered that barium tantalum bronze of the formula $Ba_{0.5}TaO_3$ and strontium niobium bronze of the formula $Sr_xNbO_3$, wherein $x$ varies from 0.70 to 0.95, can be used as oxygen electrodes in fuel cells having an aqueous electrolyte. These bronzes are conductive, corrosion resistant at high anodic electrode potentials in aqueous solution and good catalysts for the oxygen reduction reaction. The bronzes may be utilized as such or in conjunction with a suitable conductive substrate, e.g., porous carbon, metals, etc. Preferably, the catalyst is admixed with the substrate.

It is, therefore, a principal object of the present invention to provide novel electrodes for use in fuel cells having an aqueous electrolyte.

It is a further object of the invention to provide fuel cells utilizing such novel electrodes.

These and other objects and advantages of the present invention will become apparent on consideration of the electrodes and fuel cells more fully described in the discussion and examples which follow.

In its electrode aspect, the present invention is a fuel cell electrode comprising barium tantalum bronze of the formula $Ba_{0.5}TaO_3$ or strontium niobium bronze of the formula $Sr_xNbO_3$, wherein $x$ is a value between 0.70 and 0.95, disposed on an electrically conductive substrate.

In its fuel cell aspect, the present invention is a fuel cell comprising a cathode and an anode in separate electrical contact with an aqueous electrolyte, means for supplying combustible fuel to the anode, and means for supplying an oxidizing gas to the cathode, said cathode comprising barium tantalum bronze of the formula $Ba_{0.5}TaO_3$ or strontium niobium bronze of the formula $Sr_xNbO_3$, wherein $x$ is a value between 0.70 and 0.95.

As noted previously, the half-cell reactions taking place at the cathode and the anode are essentially independent of each other. Thus, a given oxygen electrode can be used in combination with a variety of fuel electrodes. The fabrication of fuel cells containing aqueous electrolytes is well known to those skilled in the art.

EXAMPLE 1

Barium bronze of the composition $Ba_{0.5}TaO_3$ was prepared using the method described in the Journal of the American Chemical Society, 81, 5898 (1959). The powders obtained were pressed into the form of an electrode, in admixture with pure gold powder in a 1 to 2 volume ratio, at a pressure of about 12 tons per square centimeter. The resultant electrodes were tested as oxygen electrodes in a concentrated potassium hydroxide solution. The logarithm of the current density obtained was linear with potential exhibiting a slope of 60 mv. and an exchange current density of about $10^{-9}$ amps/cm.$^2$ of the real surface area.

EXAMPLE 2

Strontium niobium bronze of the composition $Sr_xNbO_3$, wherein $x$ is a value between 0.70 and 0.95, were prepared using the method described in the Journal of the American Chemical Society, 77, 6132 (1955). The powders obtained were pressed into the form of an electrode, in admixture with nickel powder in a 1 to 2 volume ratio, using pressures of about 20 tons per square centimeter. The resultant electrodes were tested as oxygen electrodes in 1 N sodium hydroxide supplied with gaseous oxygen at a pressure of one atmosphere. The logarithm of the current density obtained was linear with potential exhibiting a slope of 60 mv. and an exchange current density of about $10^{-9}$ amps/cm.$^2$ of the real surface area.

When tested as cathode catalysts in a conventional fuel cell comprising a cathode and an anode in separate electrical contact with an alkaline electrolyte having a hydrocarbon gas supplied to the anode and oxygen supplied to the cathode, the above-described electrodes exhibited satisfactory catalytic activity for oxygen reduction and good electrochemical performance in the cell.

Other variations falling within the scope of the present invention will be apparent to those skilled in the art. Our invention is as claimed.

We claim:
1. A fuel cell comprising a cathode and an anode in separate electrical contact with an aqueous electrolyte, means for supplying combustible fuel to the anode, and means for supplying an oxidizing gas to the cathode, said cathode comprising barium tantalum bronze of the formula $Ba_{0.5}TaO_3$ or strontium niobium bronze of the formula $Sr_xNbO_3$, wherein $x$ is a value between 0.70 and 0.95, disposed on an electrically conductive substrate.
2. In a fuel cell comprising a cathode and an anode in separate contact with an aqueous electrolyte, means for passing a combustible fuel into contact with the anode, means for passing an oxidizing gas into contact with the cathode, the improvement which comprises employing barium tantalum bronze of the formula $Ba_{0.5}TaO_3$ or strontium niobium bronze of the formula $Sr_xNbO_3$, wherein $x$ is a value between 0.70 and 0.95, as the cathode catalyst.

(References on following page)

References Cited

UNITED STATES PATENTS

| | | | |
|---|---|---|---|
| 3,288,653 | 11/1966 | Holt et al. | 136—86 |
| 3,393,100 | 7/1968 | Niedrach | 136—86 |

FOREIGN PATENTS

| | | | |
|---|---|---|---|
| 1,477,235 | 3/1967 | France | 136—120 |

OTHER REFERENCES

Brimm et al., J. Amer. Chem. Soc., vol. 73, pp. 5427–5432, 1951.

Ridgley et al., J. Amer. Chem. Soc., vol. 77, pp. 6132–6136, 1955.

Galasso et al., J. Amer. Chem. Soc., vol. 81, pp. 5898–5899, 1959.

WINSTON A. DOUGLAS, Primary Examiner

M. J. ANDREWS, Assistant Examiner

U.S. Cl. X.R.

136—120